United States Patent
Di Bernardo et al.

(10) Patent No.: US 6,552,729 B1
(45) Date of Patent: Apr. 22, 2003

(54) AUTOMATIC GENERATION OF ANIMATION OF SYNTHETIC CHARACTERS

(75) Inventors: Enrico Di Bernardo, Pasadena, CA (US); Luis F. Goncalves, Pasadena, CA (US); Pietro Perona, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/434,210

(22) Filed: Nov. 4, 1999

Related U.S. Application Data

(60) Provisional application No. 60/115,296, filed on Jan. 8, 1999.

(51) Int. Cl.$^7$ .............................................. G06T 15/00
(52) U.S. Cl. ..................................................... 345/473
(58) Field of Search ................................ 345/473, 474, 345/475, 468, 467, 419, 420, 427

(56) References Cited

U.S. PATENT DOCUMENTS

| 6,304,264 B1 | * 10/2001 | Chen et al. ................... | 345/419 |
| 6,317,132 B1 | * 11/2001 | Perlin .......................... | 345/474 |
| 6,388,668 B1 | * 5/2002 | Elliott .......................... | 345/474 |

OTHER PUBLICATIONS

Badler et al., "Simulating Humans", Oxford University Press, 1993., 28 pp.
Bruderlin et al., "Motion Signal Processing", Computer Graphics Proceedings, Annual Conference Series (SIGGRAPH) 1995, pp. 97–104.
DiBernardo et al., "Generating Realistic Human Motions from Observations," Fifth European conf. on Computer Vision, ECCV '98, pp. 1–12.
DiBernardo et al., "Monocular Tracking of the Human Arm in 3D: Real–Time Implementation and Experiments," 1996, IEEE, Proceedings of ICPR '96, pp. 622–626.

(List continued on next page.)

*Primary Examiner*—Phu K. Nguyen
(74) *Attorney, Agent, or Firm*—Christie, Parker & Hale, LLP

(57) ABSTRACT

The present invention provides a technique for acquiring motion samples, labeling motion samples with labels based on a plurality of parameters, using the motion samples and the labels to learn a function that maps labels to motions generally, and using the function to synthesize arbitrary motions. The synthesized motions may be portrayed through computer graphic images to provide realistic animation. The present invention allows the modeling of labeled motion samples in a manner that can accommodate the synthesis of motion of arbitrary location, speed, and style. The modeling can provide subtle details of the motion through the use of probabilistic sub-modeling incorporated into the modeling process. Motion samples may be labeled according to any relevant parameters. Labels may be used to differentiate between different styles to yield different models, or different styles of a motion may be consolidated into a single baseline model with the labels used to embellish the baseline model. The invention allows automation of labeling to increase the efficiency of processing a large variety of motion samples. The invention also allows automation of the animation of synthetic characters by generating the animation based on a general description of the motion desired along with a specification of any embellishments desired.

83 Claims, 12 Drawing Sheets

OTHER PUBLICATIONS

Goncalves et al., "A tensorial decompositioni method for learning human motion", Technical Report CNS–TR–98–003, California Institute of Technology, Caltech, MS 136–93, Pasadena CA 91125, Mar. 27, 1998, pp. 1–7.

Goncalves et al., "Human Motion Learning," IEEE Conf. on Computer Vision & Pattern Recognition, CVPR '98, 7 pp.

Goncalves et al., "Monocular tracking of the human arm in 3d". In Proc. 5th Int. Conf. Computer Vision, pp. 764–770, Boston, Jun. 1995.

Goncalves, et al., "Reach Out and Touch Space (Motion Learning)," Third Int. Conf. on Automatic Face and Gesture Recognition, FG '98, pp. 1–6.

Hodgins et al., "Animating Human Athletics", In Computer Graphics Proceedings, Annual Conference Series, pp. 71–78, 1995, 8 pp.

Lathauwer et al., "From Matrix to Tensor: Multilinear Algebra and Signal Processing," Dec. 1996, 13 pp.

Metaxas, "Articulated Figure Dynamics, Behavior and Control", In SIGGRAPH97 Course Notes CD–ROM. ACM SIGGRAPH, Aug. 3–8, 1997, pp. 1–38.

Perlin, "Real Time Responsive Animation with Personality", IEEE Transaction on Visualization and Computer Graphics, 1(1):5–15, Mar. 1995, pp. 5–15.

Rose et al., "Efficient Generation of Motion Transitions using Spacetime Constraints" In Int. Conf. on Computer Graphics (SIGGRAPH) '96, 8 pp., Aug. 1996.

Shy et al., "X–Y Separable Pyramid Steerable Scalable Kernels," 8 pp.

Singh et al., "Human Figure Synthesis and Animation for Virtual Space Teleconferencing," 1995 IEEE, pp. 118–126.

Thalmann et al., "Digital Actors for Interactive Television," Proceedings of the IEEE, vol. 83, No. 7, Jul. 1995, New York, United States, pp. 1022–1031.

* cited by examiner

AUTOMATIC GENERATION OF ANIMATION OF SYNTHETIC CHARACTERS

RELATED APPLICATIONS

This application is based on provisional patent application Ser. No. 60/115,296 filed Jan. 8, 1999.

The U.S. Government has rights in this invention pursuant to Contract No. IRI 9457618 and Contract No. EEC 9402726, both awarded by the National Science Foundation.

FIELD OF THE INVENTION

The invention relates to computer graphics generally and, more particularly, to analysis of motion and generation of animated computer graphics.

BACKGROUND OF THE INVENTION

In the field of computer graphics, the automatic generation of realistic animation, such as synthesis of human motion, has been a difficult problem to solve. Even non-automatic computer-assisted generation of realistic animation has been difficult. Current approaches to realistic human character animation may be classified into two broad categories. One category covers dynamics-based approaches, while the other category covers kinematics-based approaches.

Dynamics-based approaches attempt to solve the problem by simulating physical reality. Motions are generated according to some optimality criteria (such as minimizing joint torques, or following some desired joint trajectories), and taking into account gravity, contact with the floor, moments of inertia of body parts, etc. For example, one approach assumes a functional form for joint torque inputs and solves a Lagrangian formulation of the equations of motion with constraints.

In principle, dynamics-based approaches could generate realistic motion if they incorporate all of the essential components of reality. However, so far, these systems have produced motions which to human observers appear too "smooth" or "linear" or "flat." This unrealistic result occurs because human motion is not only a function of the physics of motion, but also a function of the control input from our brains to our bodies. In fact, for typical everyday motions (where velocities are far from maximum), the control input is probably more important than the physics. One can act old, sad, or nervous, all with the same body, just by changing the control inputs.

Kinematics-based approaches (historically preceding dynamical approaches) have attempted to generate realistic motion by manipulating joint coordinates and body positions directly. This avoids the complicated and computationally costly need for dynamical simulation. An example of this type of approach is the computer animation technique of key-framing, where an artist defines the body pose and position at certain key times (frames of animation), and the computer produces additional frames between the key-frames to generate the entire sequence. This technique is very labor intensive and requires the trained hand of an artist. Another drawback of this technique is that it cannot be used interactively to adapt animation in response to user actions or to other runtime conditions.

Another kinematics-based approach is the real-time robotics technique of inverse kinematics. While the robotic technique of inverse kinematics does provide a method of automatically altering the joint coordinates of a body in real-time (interactively) in response to user input, it is not satisfactory because the resulting motion is typically unrealistic and robotic-looking. Thus, kinematics-based approaches have not so far yielded automatic generation of realistic animation.

There is also a perceptual aspect of human motion that complicates attempts at generating realistic animation of human or human-like characters. Humans tend to spend much time interacting with other humans, and thus tend to develop much experience at observing human motion. In fact, humans may actually learn how to move their own bodies from observing the motion of other humans. Humans tend to perceive differences in human motion at a more subtle level than differences in other types of motion. Thus, humans are more capable of detecting inaccuracy in the animations of human or human-like motion than inaccuracy in other types of motion, for example dinosaur motion. Therefore, techniques that might not be objectionable for generating dinosaur or animal animation are generally inadequate for generating human or human-like animation. Consequently, there still exists a need for a technique to automatically generate realistic animation.

SUMMARY OF THE INVENTION

The present invention provides a technique for acquiring motion samples, labeling motion samples with labels based on a plurality of parameters, using the motion samples and the labels to learn a function that maps labels to motions generally, and using the function to synthesize arbitrary motions. The synthesized motions may be portrayed through computer graphic images to provide realistic animation.

The invention overcomes the inability of prior dynamics-based modeling techniques to fully incorporate all relevant physical phenomena and the increasing computational complexity that arises in those dynamical approaches that attempt to do so. The invention also avoids the labor-intensive efforts required by the prior kinematics-based techniques and provides a capability for responding to high-level control inputs to interactively adapt the animation in a manner not provided by the prior kinematics-based techniques.

The present invention allows the modeling of labeled motion samples in a manner that can accommodate the synthesis of motion of arbitrary location, speed, and style. The modeling can provide subtle details of the motion through the use of probabilistic sub-modeling incorporated into the modeling process.

Motion samples may be labeled according to any relevant parameters. The number of parameters may be increased to provide more variations of possible motion or reduced to increase the efficiency of the process. Labels may be used to differentiate between different styles to yield different models, or different styles of a motion may be consolidated into a single baseline model with the labels used to embellish the baseline model.

The invention allows automation of the animation of synthetic characters by generating the animation based on a general description of the motion desired along with a specification of any embellishments desired.

DETAILED DESCRIPTION OF THE PREFERRED EMBODIMENTS

The present invention provides a technique for acquiring motion samples, labeling motion samples with labels based on a plurality of parameters, using the motion samples and the labels to learn a function that maps labels to motions generally, and using the function to synthesize arbitrary motions. The synthesized motions may be portrayed through computer graphic images to provide realistic animation.

Information adequate to describe motion of a subject can often be expressed in terms of the motion of a finite number of points. For example, a human body in motion can be accurately described in a very efficient way with reference to the motion of a dozen or so points on the body. For example, if the motion of the ankles, knees, hips, shoulders, elbows, wrists, neck and head are known, it is easy to infer, either by psychophysical perception or by graphical rendering techniques, motion of other parts of the human body. From the motion of these points, it is possible to distinguish human gaits from other non-biological motions, to identify gender, and even to determine the subject's emotional state.

Figure 2:
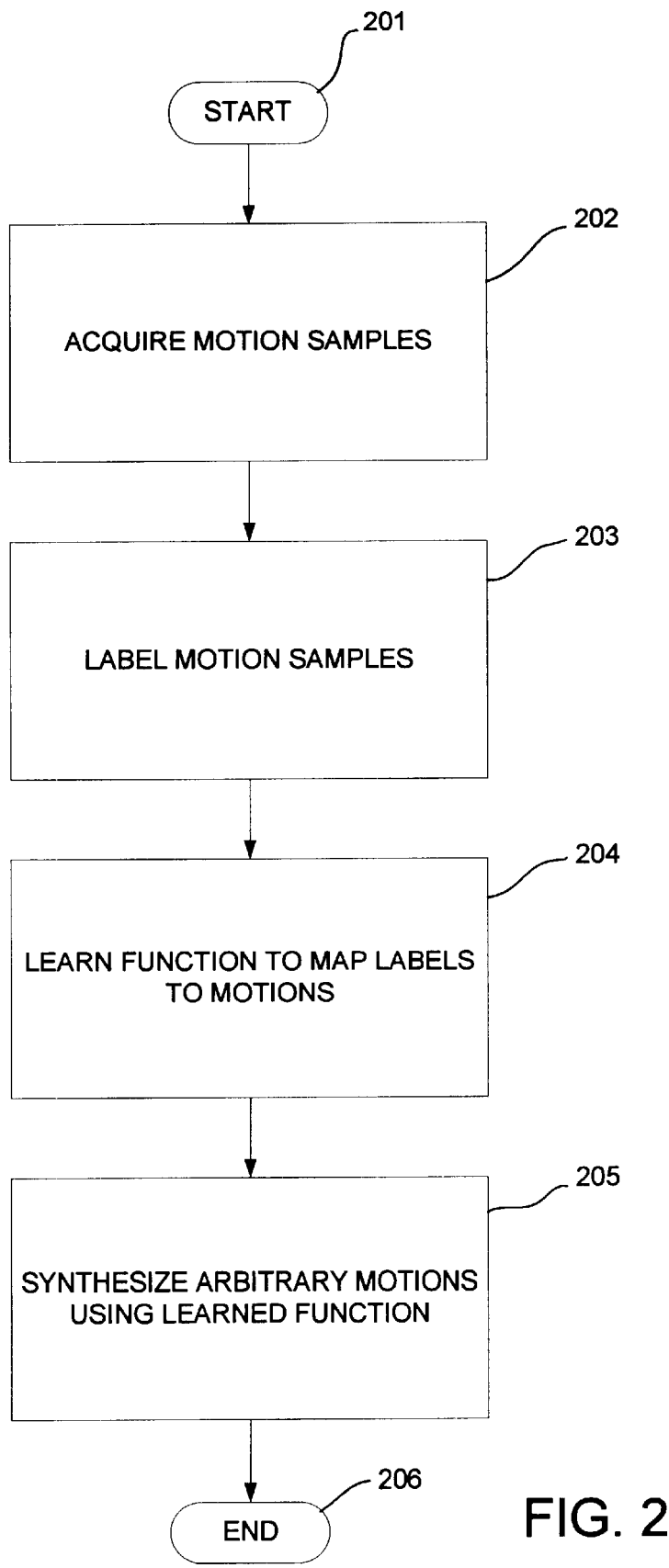
FIG. 2 is a flow diagram illustrating a method for automatic generation of animated images.

FIG. 2 is a flow diagram illustrating a method for automatic generation of animated images. The process begins in step 201. In step 202, motion samples are acquired. In step 203, motion samples are labeled. In step 204, a function is learned to map labels to motions. In step 205, arbitrary motions are synthesized using the learned function. The process ends in step 206.

To acquire information to describe the motion of an subject, several techniques may be employed. For example, motion samples may be provided by the drawings of an artist, such as a sequences of animation drawings entered on a graphics tablet. Other examples of possible sources for motion samples include two-dimensional optical systems (such as those with one camera), three-dimensional optical systems (such as those with multiple cameras), three-dimensional magnetic systems (such as those utilizing multiple orthogonal magnetic fields), mechanical (exo-skeleton) capture systems (such as those worn by a human or part of a live-action puppet), two- or three-dimensional animations provided by an artist, or reconstruction of two- or three-dimensional motion from video footage or live camera action (for example, using computer vision techniques). Regardless of the source of the motion samples, an embodiment of the invention provides a process for learning models that can be used to synthesize new motions.

Figure 1:
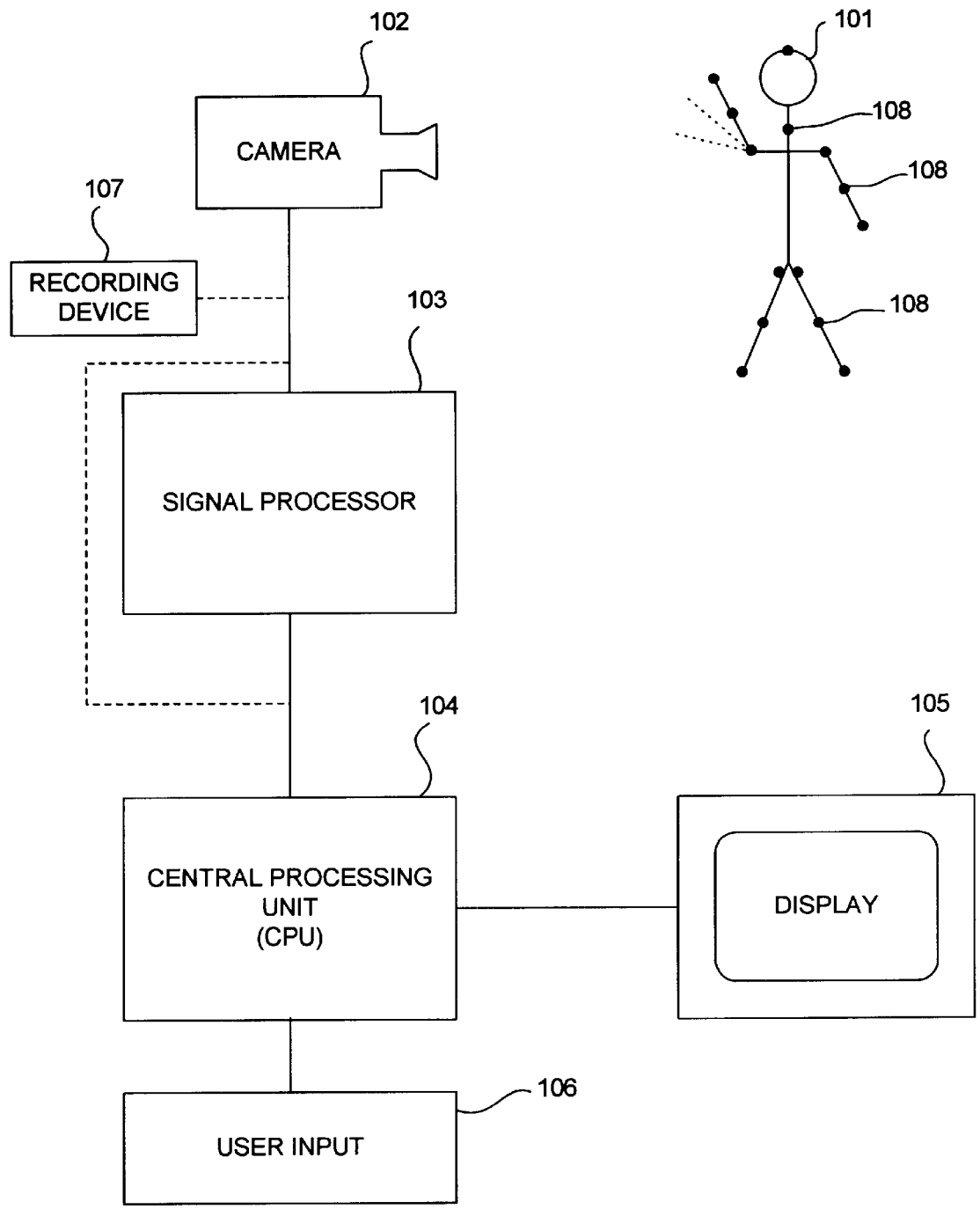
FIG. 1 is a block diagram illustrating a system for acquiring motion samples and generating animated images.

As an example, a motion capture system as illustrated in FIG. 1 may be provided. FIG. 1 is a block diagram illustrating a system for acquiring motion samples and generating animated images. The system comprises one or more cameras 102 for observing the motion of a subject 101 and for providing a sequence of frames of images of the subject 101. One camera 102 may be used to observe the motion of subject 101 in two dimensions, while two or more cameras may be used to observe three-dimensional motion. The one or more cameras 102 may be coupled to a signal processor 103, such as a digital signal processing (DSP) subsystem. The one or more cameras 102 and signal processor 103 may be optionally coupled to one or more recording devices 107, such as a videotape recorder or video storage subsystem, to store the sequence of frames of images of the subject 101 for later processing. The signal processor 103 processes the sequence of frames of images of the subject 101 to extract information regarding the position of the points 108 for which analysis is desired. The signal processor 103 identifies each point 108 in each frame according to its location on the subject 101. For points 108 that are obscured from view in certain frames, their locations are identified by interpolation between adjacent frames.

After the motion samples are processed by signal processor 103, the resulting information is passed to a central processing unit (CPU) 104. CPU 104 segments individual motions and re-samples the sequence of frames to normalize its length in numbers of frames. These steps may be assisted by user input, for example user input provided through user input device 106. CPU 104 processes the sequence of frames to provide a matrix where each column of the matrix represents a sample motion and contains the stacked coordinates of all of the points 108 for all of each motion sample's frames. For example, the matrix may be of size $N_C \cdot b \cdot N_T$ by $N_M$, where $N_C$ equals the number of dimensions (e.g., two-dimensional or three-dimensional), b equals the number of points 108 by which a subject 101 is represented, $N_T$ equals the number of re-sampled frames in each motion, and $N_M$ equals the number of motion samples.

The CPU 104 is used to perform labeling, learning, and synthesizing steps. These steps may be controlled through information received from a user input device 106. Information for the user input device 106 may be used to control the operation of signal processor 103, as well. Another step that may be performed by CPU 104, in the processing of three-dimensional information, is the reconstruction of three-dimensional coordinates based on the sequences of frames of images of the subject 101 provided by cameras 102. Synthetic motions generated using the CPU 104 may be displayed on display device 105.

The functionality of signal processor 103, or a portion thereof, may be combined with the functionality of CPU 104 and provided by CPU 104 without the need for a separate signal processor 103. In this case, one or more cameras 102 and/or one or more recording devices 107 may be coupled to CPU 104.

As another variation, one or more recording devices 107 may be coupled to CPU 104 to record information that may have come from the one or more cameras 102, that may have been processed by signal processor 103, or that may have been processed, at least to some degree, by CPU 104.

Figure 3:
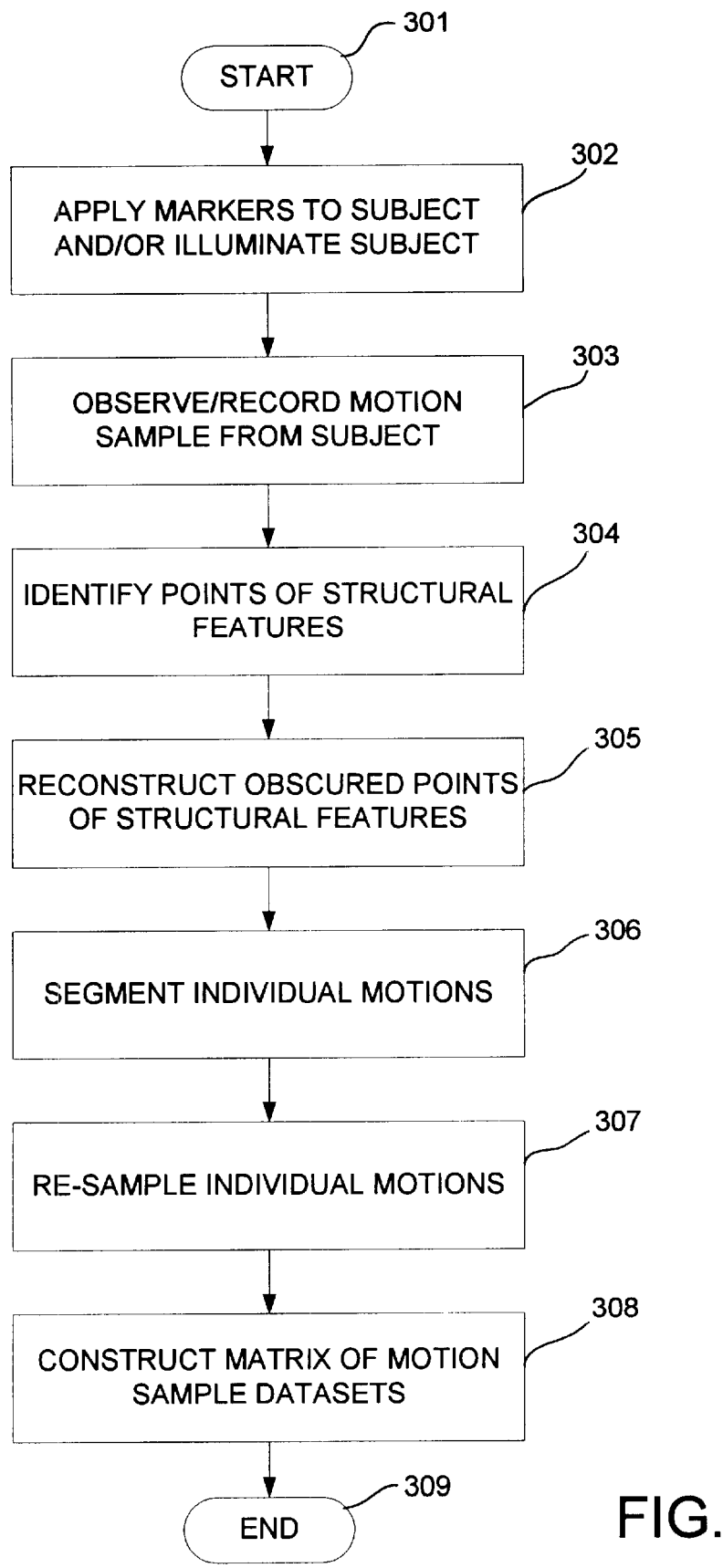
FIG. 3 is a flow diagram illustrating a method for acquiring motion samples.

FIG. 3 is a flow diagram illustrating a method for acquiring motion samples. The process begins in step 301. In step 302, markers are applied to a subject to indicate points of interest. The subject is illuminated to maximize contrast of the subject, and particularly the markers, against the background. For example, if fluorescent spheres, such as ping-pong balls are used as markers, ultraviolet lighting may be used to illuminate the markers and to distinguish them from the background.

In step 303, the subject moves, and motion samples are observed and/or recorded. In step 304, points of structural features are identified. Since the structural relationship of the structural features is, to at least some extent, known, identification of points of structural features implies knowledge of their structural relationship. This knowledge allows reconstruction of obscured points of structural features in step 305.

Alternatively, other techniques besides an optical motion capture system could be used to obtain motion samples, as described above. If such other techniques are used, steps 302 through 305 may be omitted, and the motion samples provided by the other techniques may be processed according to steps 306 through 309.

In step 306, individual motions are segmented. The continuum of motion of a variety of individual acts is divided in time into individual motions, each representative of an individual act, for example a single reach or a single step. The segmentation may be at a low enough level to yield a diverse repertoire of motions and to allow fine-grained control over the generation of animated motion. Alternatively, the segmentation may be at a higher level to reduce the number of individual motions needed to provide a composite motion.

In step 307, the individual motions are re-sampled. This re-sampling allows the motion samples to be normalized to a common length or number of frames. Subsequent processing of the motion samples may be simplified if the motion samples are known to have a common length or number of frames. By normalizing the motion samples to a common length or number of frames, unnecessary temporal resolution may be reduced, thereby making storage and processing of the motion samples more efficient. Furthermore, if necessary, the technique of dynamic time warping, or other automatic or semi-automatic procedures, is used to align in time critical events during the motion. Use of such techniques and procedures enhances the inter-sample consistency of the data set, which improves the results of the motion learning procedure.

In step 308, a matrix is constructed of motion sample datasets. The matrix contains information representative of the coordinates of the point of structural features for re-sampled frame of each instance of each motion sample. There may be multiple instances of a motion sample if multiple attempts were made at performing the same motion and gathering a motion sample. In step 309, the process ends.

Alternatively, motion sample datasets may be obtained from sources other than a motion capture system. For example, motion samples may be provided based on an artist's animations, which may be generated using a key frame technique described above. The artist may provide information in two or three dimensions. If an artist's animations are used, steps 302 to 306 may be omitted and replaced by the step of providing the artist's animations.

After the motion samples are acquired, the motion samples are assigned labels. The labels parameterize the motions according to high-level descriptions, such as direction of motion, speed of motion, mood, style, and age of the subject. For example, in one embodiment of the invention, the set of motion samples acquired are reaching motions having a certain destination reach position. In this case, knowing the destination reach position is sufficient to specify completely the motion, and thus the labels for this dataset may be two-dimensional vectors defining the destination reach position on the image plane. If the dataset were to comprise walking cycles in which the subject varied his gait, then the motion samples would be labeled according to the speed of the motion and to the location of the feet on the floor.

Any number and variety of labels may be employed. For example, motion samples may be labeled as to the general type of motion (e.g., walking, running, pointing, etc.), the direction and speed of the motion, the style and mood of the subject, and the age and gender of the subject. The subjects may also be identified according to attributes such as size, body proportions, agility, etc. Alternatively, motion samples from a subject having certain attributes may be scaled or otherwise modified to substitute for motion samples of subjects having different attributes. For example, motion samples from a tall subject may be re-scaled to substitute for motion samples of a short subject.

Figure 4:
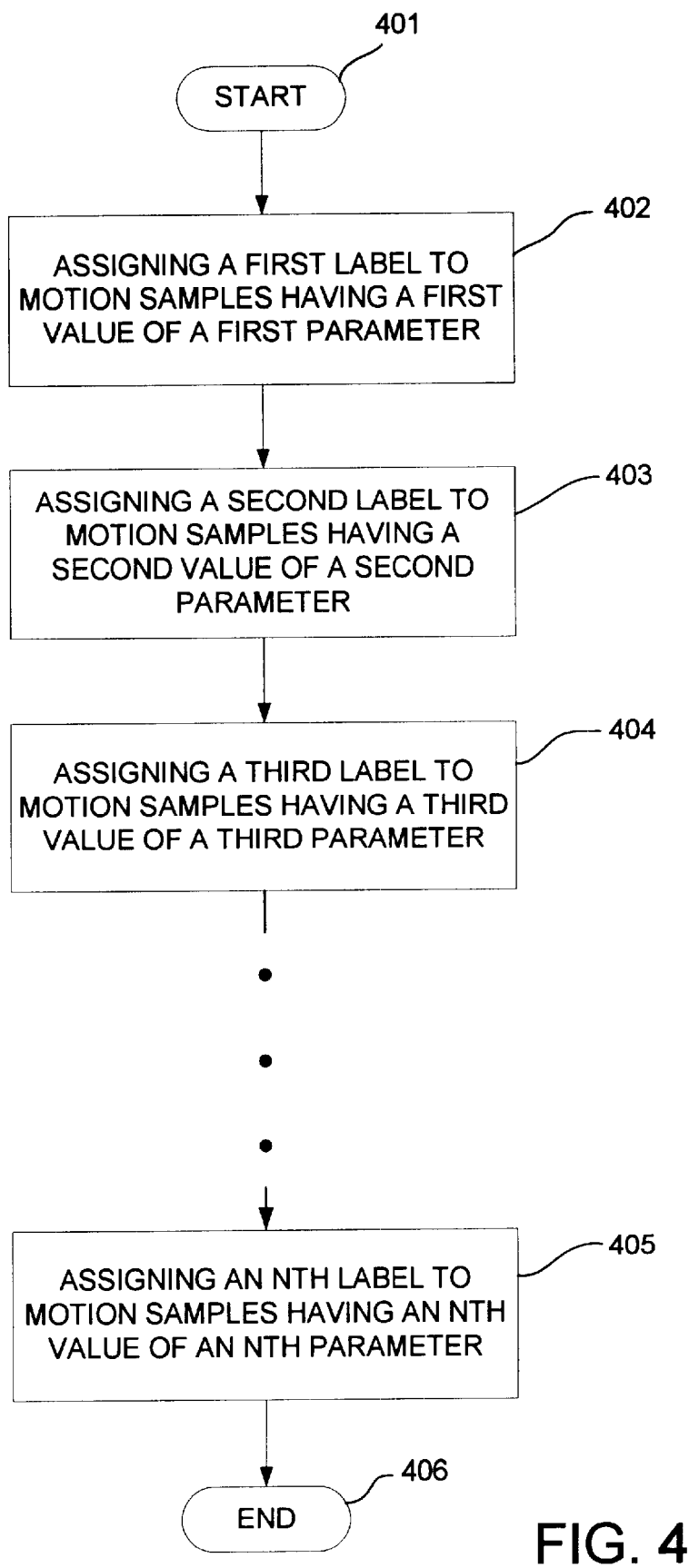
FIG. 4 is a flow diagram illustrating a method for labeling motion samples.

FIG. 4 is a flow diagram illustrating a method for labeling motion samples. The process begins in step 401. In step 402, a first label is assigned to motion samples having a first value of a first parameter. For example, the first parameter might characterize height, and the first value might be "tall." Other possible values for the height parameter might include "short," "6 foot, 1 inch," "170 cm," etc. In step 403, a second label is assigned to motion samples having a second value of a second parameter. For example, the second parameter might characterize mood, and the first value might be "happy." Other possible values might include "sad," "agitated," "angry," "tired," etc. Alternatively, the second parameter might characterize "happiness," and a numeric value might be assigned depending on the level of happiness.

In step 404, a third label is assigned to motion samples having a third value for a third parameter. This process continues with the optional assignment of additional labels. In step 405, an nth label is assigned to motion samples having an nth value of an nth parameter. The process ends in step 406.

In an embodiment of the invention, different labels may be used to represent different aspects of a desired motion. For example, goal labels may be applied to the data set based on a goal parameter which describes the goal of the subject in performing an action captured by the motion samples. A style label may be applied to the data set based on a style parameter descriptive of a style of subject expressed in the data set. Different goal labels and style labels may be applied to each data sample of the data set. A state label may be applied to a data sample to indicate a state of the dynamic positional information represented by the data sample. For example, the state label may indicate the state of the dynamic positional information at the beginning and/or end of the data sample. The state label may be used to coordinate transition from one motion to another.

Once the labels are assigned, a mathematical function may be learned to map the labels to the motions. Label-motion pairs that include $l^i$ and $m^i$, where $l^i$ is the $i^{th}$ label associated with the $i^{th}$ motion vector $m^i$, can be used as examples to derive a function f which maps labels into motions. The function $f: L \rightarrow M$ maps $l^i$ into $m^i$ for $i=1, 2, \ldots, N_M$, where L is the label space ($L=R^{n_L}$ where $N^L$ is the dimension of the label vectors) and M is the motion space (M=$R^{2 \cdot b \cdot N_T}$, where $2 \cdot b \cdot N_T$ is the dimension of the stacked coordinates in the $N_T$ re-sampled frames). The function space over which the best function is selected is such that the $k^{th}$ component of the estimated motion vector $\hat{m}_k$ is given by $$\hat{m}_k = f_k(l) = \sum_{j=0}^{N} w_{jk} \phi_j(l)$$

where the $\{W_{jk}\}$ are weights to be determined and the N functions $\phi_j(l)$ are basis functions over the input space. The best function f*, in other words the function that most closely maps the labels to the motions, may be determined using various mathematical techniques. For example, different types of basis functions may be applied to yield a function that accurately maps labels to motions. Examples of two types of basis functions that may be used include polynomial basis functions and radial basis functions.

If $(x_1, x_2, \ldots, x_{N_L})$ are the components of the label vector l, then the polynomial basis functions of degree NP are the terms in $(x_1, x_2, \ldots, x_{N_L})$ of the form $$1^{d_0} x_1^{d_1} x_2^{d_2} \ldots x_{N_L}^{d_{NL}},$$

where $0 <= d_0, d_1, \ldots, d_{N_L} <= N_p$ such that $d_0 + d_1 + d_2 + \ldots d_{N_L} = N_p$ For example, if $N_L$=3 (3-dimensional label), and we want to use polynomial basis functions of degree $N_p$=2, then there are 15 functions, among which are the constant function and the linear terms.

The best function f* in the function space is found by finding the best set of coefficients $\{W^*_{jk}\}$ as $$\{w^*_{jk}\} = \arg \min_{\{w_{jk}\}} \sum_{i,k} (f_k(l^i) - m^i_k)^2$$

Denoting as $\overline{M}$ the matrix with all the sample motions as column vectors, W* the matrix of coefficients such that $W^*_{(kj)} = w^*_{jk}$, and Φ such that element $\Phi_{(j,i)} = \phi_j(l^i)$, then the above minimization can be solved as $$W^* = \overline{M} \Phi^\dagger$$

where $\Phi^\dagger$ indicates the pseudo-inverse of Φ.

For the case of radial basis functions, the basis functions take the form $$\phi_j(l) = e^{-\frac{1}{2}(l - \mu_j) \Sigma_j^{-1}(l - \mu_j)^T}$$

where $\mu_j$ and $\Sigma_j$ define the center and spread of the $j^{-th}$ function. The optimal coefficients may be found using an orthogonal least squares minimization procedure, for example such a procedure provided by a MATLAB neural networks toolbox routine. This routine not only finds the $\{w_{jk}\}$ coefficients, but also determines the optimal $\mu_j$ for the given number of radial basis functions desired and a user-specified $\Sigma_j$.

While the acquired data samples represent a finite number of motions between a finite number of locations, the modeling process serves to effectively generalize the data samples to characterize the desired motion over the available motion space. Thus, if a motion were desired to be performed in a manner that differs in some respect from the acquired data samples, the desired motion may be derived from the learned model by choosing the appropriate values for the input parameters (labels) and applying it to the learned model.

Figure 5:
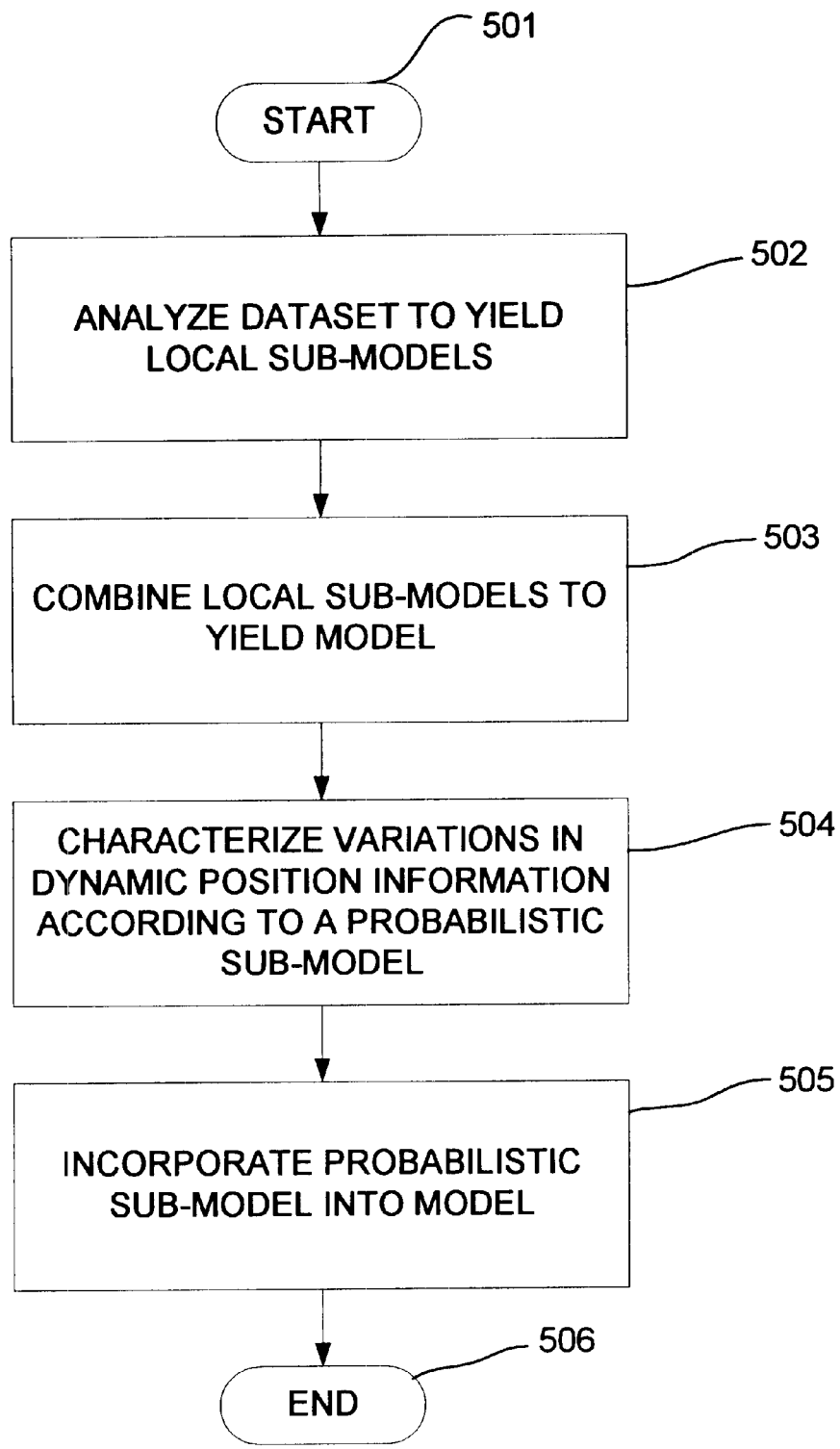
FIG. 5 is a flow diagram illustrating a method for learning functions to map labels to motions.

FIG. 5 is a flow diagram illustrating a method for learning functions to map labels to motions. The process begins in step 501. In step 502, the dataset is analyzed to yield local sub-models. If a global model of a motion is not as accurate as desired across all regions of the motion space, local sub-models may be created to model a particular region of the motion space. The local sub-models allow increasing the accuracy of the global model in the regions where the global model suffers the most inaccuracy. In step 503, local sub-models are combined with the global model and with each other to yield an overall model of a motion.

In step 504, variations in dynamic position information are characterized according to a probabilistic sub-model. If various instances of a motion sample contain variations between each other, those variations can be averaged or otherwise abstracted away to yield a model of motion represented by the motion samples. However, such averaging or abstraction may reduce the information that characterizes the variability of the motion. If this variability is meaningful to human perception, for example for motions that are repeated or for poses or gestures, the realism of synthesized motions may be reduced. For example, if a human character is intended to stand still, a perfectly still rendering may appear lifeless. By including subtle detail, such as shifting of body weight and gesturing of hands, greater realism is provided. Gesturing of hands may be coordinated with audio information, such as speech, to increase realism.

To efficiently preserve the subtle detail, a probabilistic model may be created based on information not otherwise incorporated into the overall model for a motion. The probabilistic model introduces stochastic motion adjustments as similar as possible to the variation of the instances of a motion sample from the overall model of the motion. For example, a Gaussian probability density function could be used, with appropriate parameters, to model the variability of the motion samples and to provide a random variation in animation generated using a model that includes the probabilistic model. A mixture of several Gaussian probability density functions can be used to model more complex variability.

In step 505, the probabilistic model is incorporated into the overall model to yield a complete model of a motion. Thus, a synthesized motion created according to the complete model of the motion not only follows the common aspects of various instances of a motion sample, but includes variations based on the aspects of the various instances of the motion sample that are not common among them. In step 506, the process ends.

Figure 6:
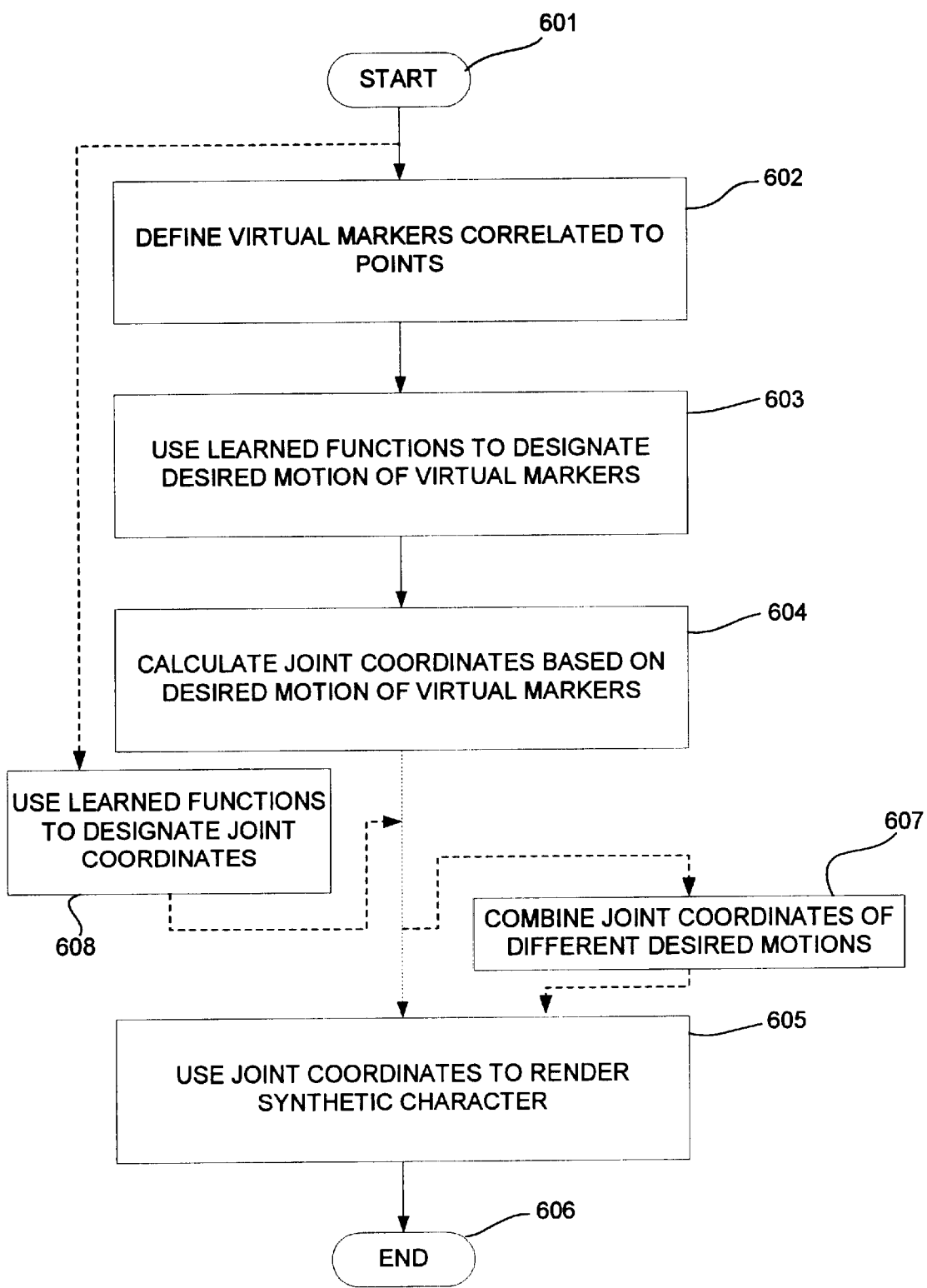
FIG. 6 is a flow diagram illustrating a method for synthesizing arbitrary motions using learned functions.

FIG. 6 is a flow diagram illustrating a method for synthesizing arbitrary motions using learned functions. The process begins step 601. In step 602, virtual markers are defined. They may be correlated to points of structural features identified during the motion capture process. In step 603, the desired motion of the virtual markers is designated. This designation may include specification of the desired starting location, the desired path, the desired ending location, and any modifications of the motion that may be desired (e.g., particular types of characters or styles of motion).

Figure 12:
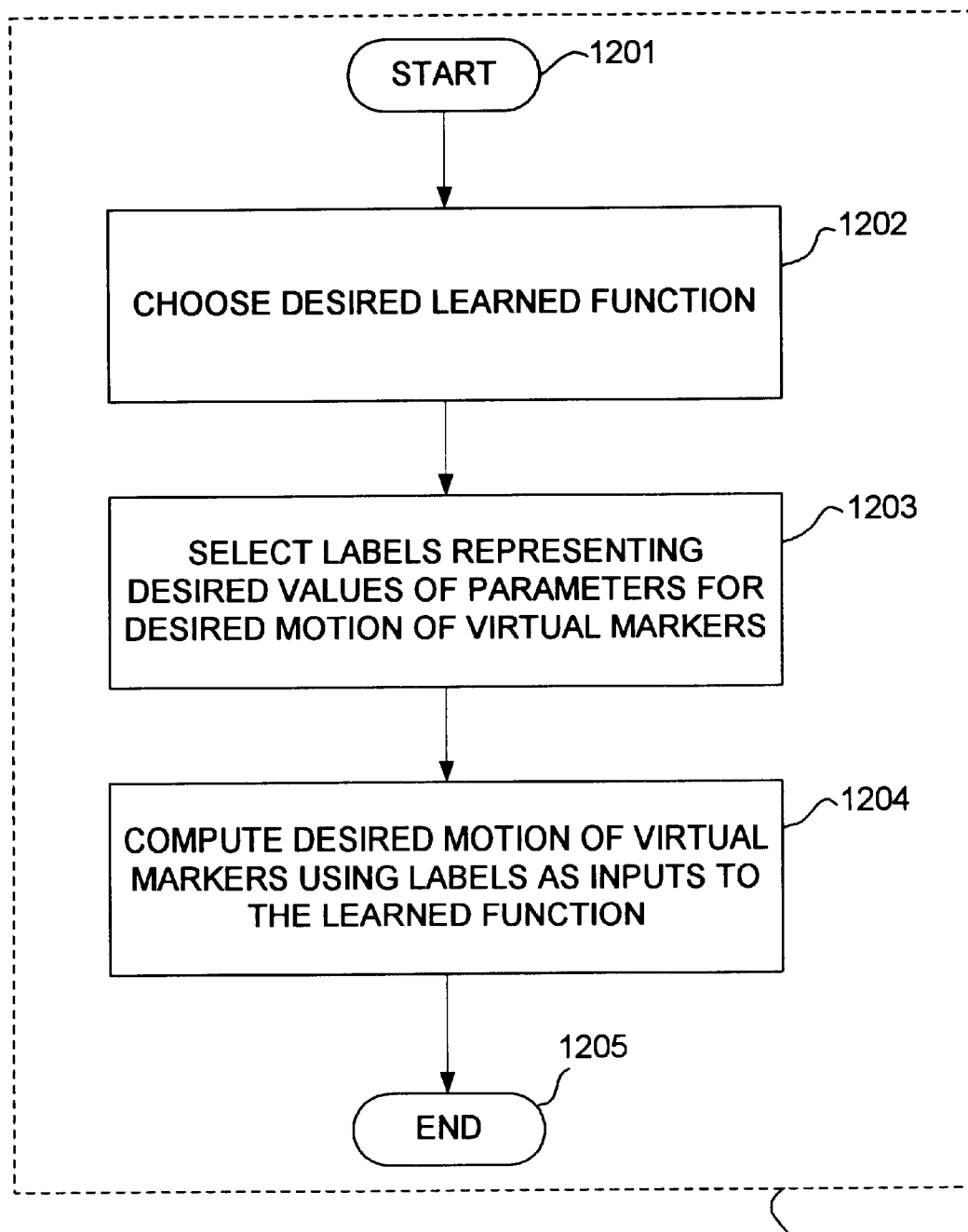
FIG. 12 is a flow diagram illustrating a process using a learned function to generate a desired motion.

Step 603 may be practiced according to a process illustrated in FIG. 12. FIG. 12 is a flow diagram illustrating a process using a learned function to generate a desired motion. The process begins in step 1201. In step 1202, a desired learned function is chosen. In step 1203, labels representing desired values of parameters for the desired motion of the virtual markers are selected. In step 1204, the desired motion of virtual markers are computed using the labels as inputs to the desired learned function. In step 1205, the process ends.

In step 604, joint coordinates are calculated based on desired motion of virtual markers. The joint coordinates specify the desired locations of the points of structural features over time during the desired motion. If the desired motion is a composite motion that includes multiple actions, for example walking and waving, the walking motion and the waving motion may be processed individually through steps 602 through 604. The calculated joint coordinates for the walking and waving motions may be merged into the composite motion in optional step 607. From optional step 607, the process continues in step 605. Alternatively, if optional step 607 is omitted, the process can proceed from step 604 to step 605.

As an alternative to steps 602, 603, and 604, the process may continue from step 601 to step 608. In step 608, the learned functions are used to designate joint coordinates directly. This can be achieved by using learned functions that output joint coordinates given the input of labels. Such functions can be learned by converting motion samples to joint coordinate data and by using a learning process to determine functions with joint coordinate outputs. As described above, if the desired motion is a composite motion that includes multiple actions, for example walking and waving, the walking motion and the waving motion may be processed individually through step 608. The calculated joint coordinates for the walking and waving motions may be merged into the composite motion in optional step 607. From optional step 607, the process continues in step 605. Alternatively, if optional step 607 is omitted, the process can proceed from step 608 to step 605.

In step 605, the joint coordinates are used to render a synthetic character. The rendering process can involve displaying an entire texture-mapped surface of a synthetic character as an alternative to just the points of structural features. The synthetic character may be based on the subject used to generate the original motion samples or may be any arbitrarily created character. The process ends in step 606.

While the invention may be practiced to generate animation by applying a single model of motion to a motion plan, the invention may also be used to generate complex animation by applying multiple models of multiple motions to the motion plan. The multiple motions may be performed simultaneously, sequentially, or a combination of the two. If the multiple motions are performed simultaneously, the joint coordinates for the multiple motions may be calculated separately and divided among parts of a body to be animated.

For example, to generate animation involving multiple motions, such as walking and waving, the joint coordinates for the walking and waving motions may be computed and divided so that the joint coordinates for the arm and hand are used to animate the arm and hand, while the remaining joint coordinates are used to animate the remaining parts of the body. As the walking motion causes the location of the body to be translated in space over time, the coordinates of the arm and hand can be translated (and if appropriate rotated) in space over time to match the walking motion and keep the arm and hand together with the remaining parts of the body as the complex motion continues.

A complex motion plan may be divided into a plurality of basic motion plans. A corresponding model is applied to each of the basic motion plans to generate a plurality of animation components. The animation components are combined to yield animation according to the complex motion plan.

The animation process may be performed according to a script, a random process, a behavioral model, or some combination of these. The script may be any preprogrammed approach to providing a motion plan. The random process may be any probabilistic approach to control one or more features of the motion plan. For example, the random process may vary the manner in which animation is provided according to the motion plan or may vary the elements of the motion plan itself.

The behavioral model may provide agents that have various behavioral characteristics whereby a character animated according to an agent may respond to similar circumstances or conditions in a similar manner. The behavioral characteristics may develop over time to provide a level of uniformity or predictability to the behavioral model. The agents may be used for interacting with users over a network and/or in computer games. The network may comprise a single communication connection or a plurality of communication connections.

The generation of animation by applying the model to the motion plan may be performed in response to an input received from a user input device. The user input device may be a device actively controlled by a user, such as a keyboard, mouse or other pointing device, joystick, etc., or may be a more device for obtaining user input more passively, such as a camera, microphone, motion detector, etc. As an example, a character in an interactive computer game may be animated in response to an input received from the user input device. As an example, a synthetic character may go into a sleeping mode and be awakened in response to an input received from a user input device.

The motion plan for generating animation may be adapted on the basis of historical user interaction. User interaction can lead to a motion plan having increasing predictability and uniformity. Alternatively, variation and unpredictability can be incorporated into the motion plan so that motion plan will differ even with similar user interaction. Variation may be randomly implemented by incorporating a random variation component into the motion plan. The random variation component may be combined with a basic component to yield motion that does not look exactly the same each time it is performed. A random variation component may also be incorporated into a model used to generate animation.

Figure 7:
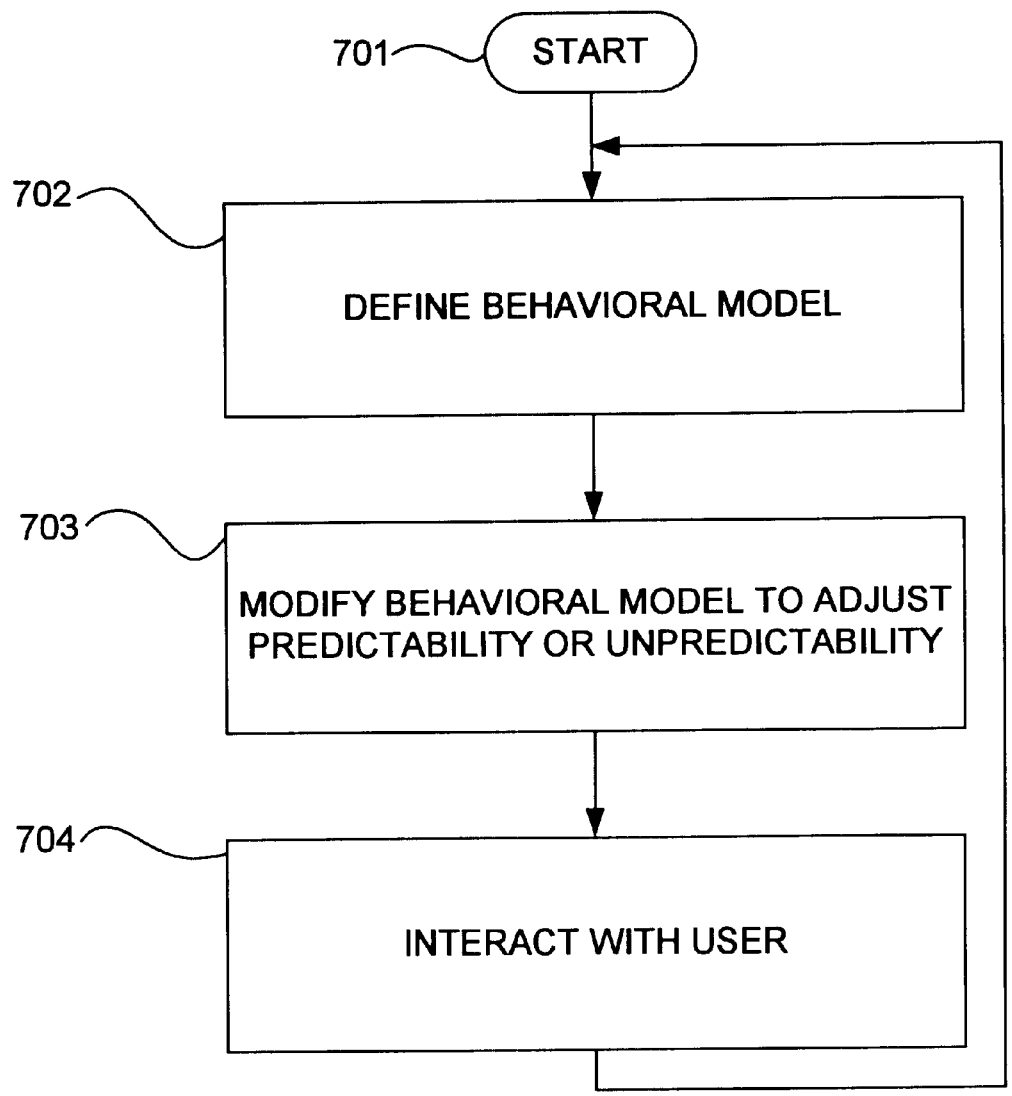
FIG. 7 is a flow diagram illustrating a process for using a behavioral model in accordance with one embodiment of the invention.

FIG. 7 is a flow diagram illustrating a process for using a behavioral model in accordance with one embodiment of the invention. The process begins in step 701. In step 702, a behavioral model is defined. In step 703, the behavioral model is modified to adjust the predictability or unpredictability of the behavioral model. In step 704, the behavioral model interacts with user. The interaction with the user can be used to modify the behavioral model when the process returns to step 702.

Animation may also be generated based on an input received from a sensor. The sensor may be of any type capable of detecting a particular phenomenon. For example, a camera may detect a static or dynamic image, or a microphone may detect sound and provide audio information. The invention may be used to animate a character to imitate the motion of a user observed using the sensor. The motion of the user is observed and captured. The captured motion is used to control a motion plan for animating the character.

Animation of a character may be performed based on a determination of the position of body parts of the user. The position of the body parts of the user are used to control the motion plan for animating the character. Alternatively, the animation of the character may be performed based on modeling of the actions of the user. The motion of the user may be captured, labeled, and modeled. The model derived from the user's motion is then used to control the motion plan for animating the character.

The input received from a sensor may be used to determine an activity of a subject, and animation may be generated or other action may be taken based on the activity. This technique may be used while a computer coupled to the sensor is in a quiescent mode, for example when the computer is displaying a screen saver. The detection of the activity may be used to cause the computer to alter the screen saver display or to switch the computer to an active mode. Alternatively, the invention may be practiced while the computer is in the active mode.

Animation information may be extracted from audio information. The audio information may be obtained in any desired manner, for example, from a microphone, through a communication circuit, or from an audio recording. If, for example, the audio information is musical, the music can be analyzed to obtain animation information. For example, the rhythm may be extracted from the music and used to control or modify the animation. Animation information extracted from audio information may be used to modify the performance of a specified animation command. For example, if a command is given to cause an animated character to walk, the cadence of the walking may be modified according to the tempo of music. Speech may also be analyzed to obtain animation information. For example, facial movements or hand gestures may be animated according to speech patterns.

Animation information may be extracted from motion information. For example, an example of human motion may be used to provide animation information. The animation information may reflect the velocity of the example of human motion. Alternatively, animation information may be extracted from non-human motion.

Figure 8:
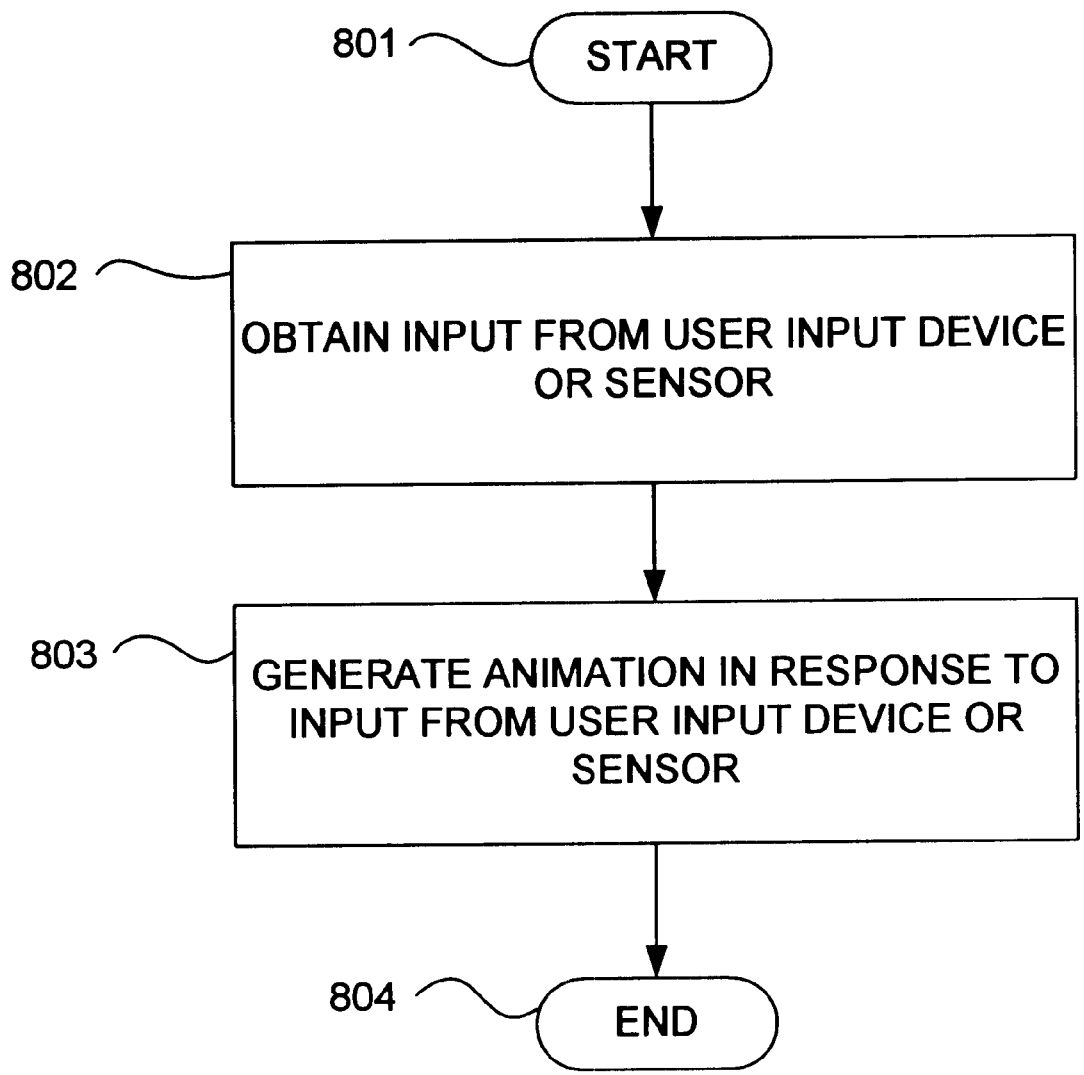
FIG. 8 is a flow diagram illustrating a process for generating animation in response to an input from a user input device or a sensor.

FIG. 8 is a flow diagram illustrating a process for generating animation in response to an input from a user input device or a sensor. The process begins in step 801. In step 802, an input is obtained from a user input device or a sensor. In step 803, animation is generated in response to the input form the user input device or sensor. In step 804, the process ends.

The creation of a model based on a data set of data samples may include the learning of a style based on a residual motion component with respect to a baseline motion component. The generation of animation by applying the model to a motion plan may include combining a residual motion animation component to a baseline motion animation component.

Figure 9:
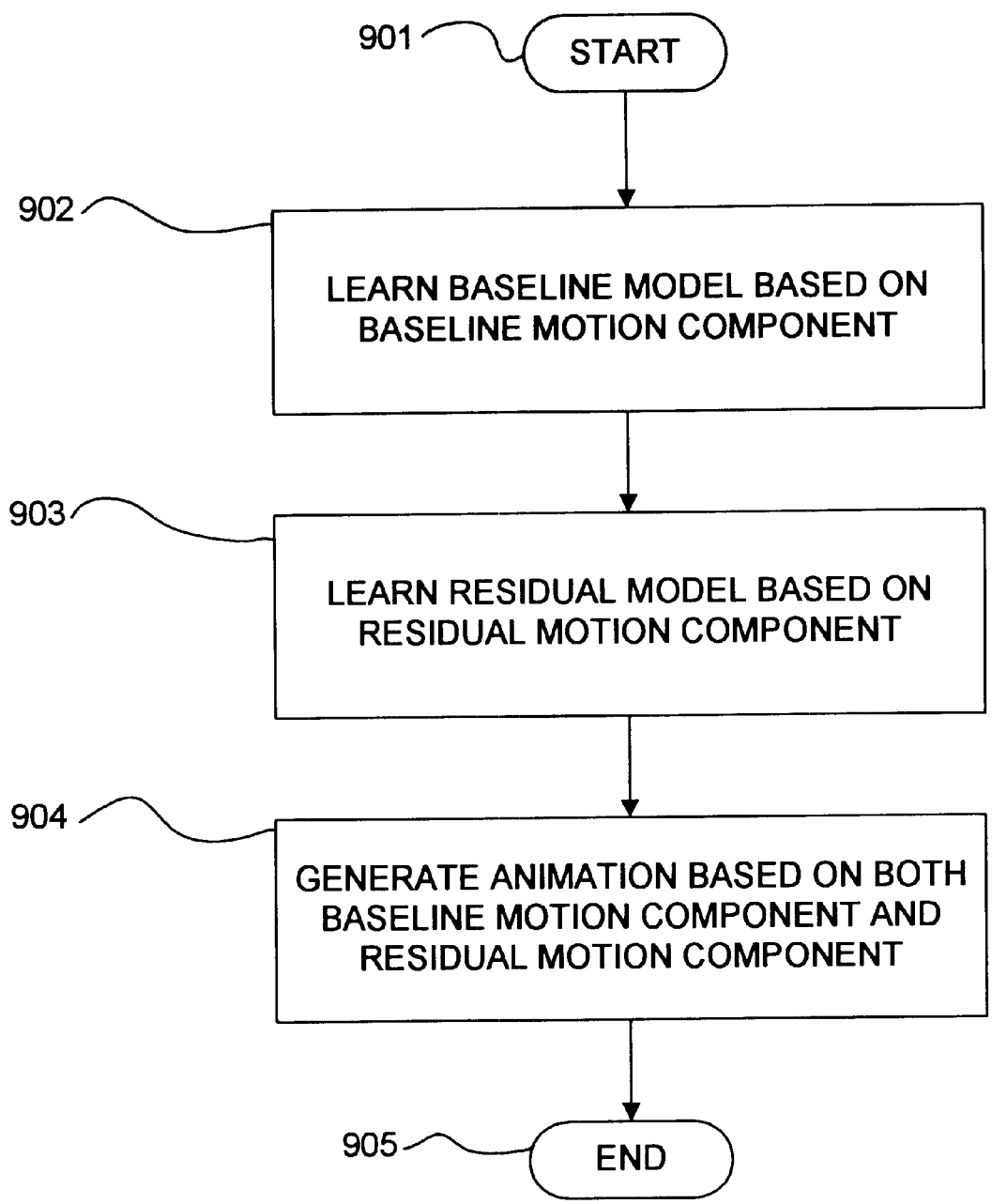
FIG. 9 is a flow diagram illustrating a process using a baseline motion component and a residual motion component according to one embodiment of the invention.

FIG. 9 is a flow diagram illustrating a process using a baseline motion component and a residual motion component according to one embodiment of the invention. The process begins in step 901. In step 902, a baseline model is learned based on a baseline motion component. In step 903, a residual model is learned based on a residual motion component. In step 904, animation is generated using the baseline motion component and the residual motion component. The process ends in step 905.

Scaling and reconfiguration may be applied to the generation of animation of a synthetic character. While information regarding a plurality of points denoting a structural relationship of a subject may be obtained during a motion capture step, the reference points corresponding to a structural relationship of a synthetic character for which animation is being generated may differ from the plurality of points. The scaling and reconfiguration may be used to generate animation of a synthetic character that differs in appearance from the subject on which the motion capture step was performed. Adjusting the scale of the plurality of points may be used to determine reference points for generating animation of synthetic characters that are larger or smaller than the subject used for the motion capture step. The angular relationship of the plurality of points may be adjusted to reconfigure the shape of the synthetic character.

Figure 10:
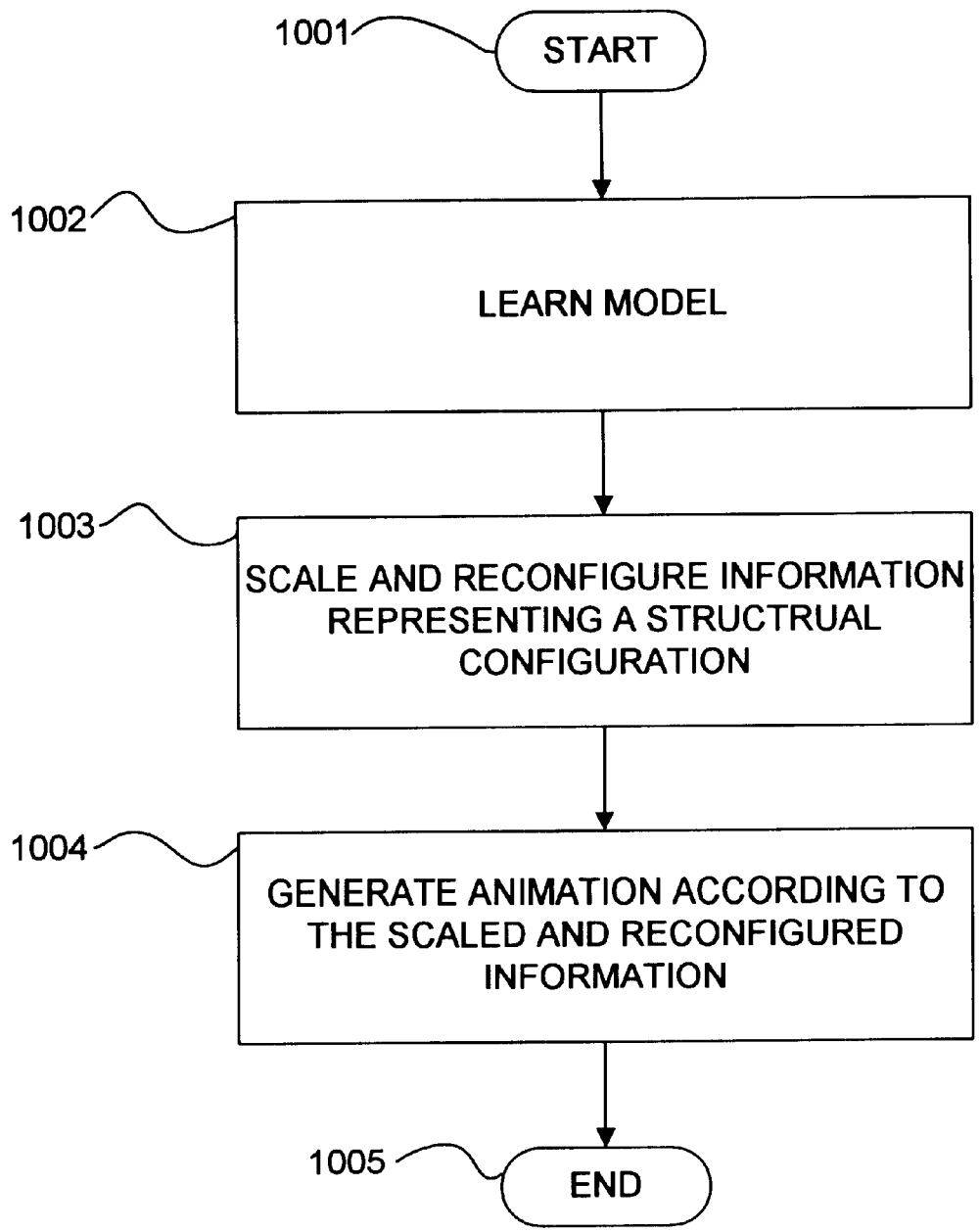
FIG. 10 is a flow diagram illustrating a process including scaling and reconfiguration according to one embodiment of the invention.

FIG. 10 is a flow diagram illustrating a process including scaling and reconfiguration according to one embodiment of the invention. The process begins in step 1001. In step 1002, a model is learned. In step 1003, information representing a structural relationship is scaled and reconfigured. In step 1004, animation is generated according to the scaled and reconfigured information. In step 1005, the process ends.

Alternatively, scaling and/or reconfiguration may be applied before or during the process of learning a model. For example, steps 1002 and 1003 may be interchanged to allow the scaling and reconfiguration to be incorporated into the model. This approach may be useful for reducing the complexity of the motion synthesis process.

While the invention is useful for generating images, such as images to be displayed with computer, video, or motion picture equipment, the invention may also be used to control the motion of apparatus. Such apparatus may include mechanical devices, for example, robots, puppets, or mechanically animated figures or toys. Even apparatus such as industrial machinery could be controlled by observing the motion of a user. All of the variations of the invention described with respect to the generation of animation may be applied to controlling the motion of apparatus.

The invention may also be used to compare a model to a plurality of previously obtained models to allow recognition of a particular action. For example, a previously obtained model similar to a given model may be identified and used to identify the subject. Subtle differences between different subjects can be characterized during the modeling process. By storing or indexing models based on actions of subjects, a subject can be identified by modeling other instances of action by the subject and comparing the model against the stored models or by looking up the appropriate stored model using the index.

The goal of the subject can also be estimated based on the data set and the model. For example, if the model relates to a reaching motion, and the data set provides initial information about a particular instance of reaching, the final location of that instance of reaching can be estimated by extrapolating from the initial information according to the model.

A kinesiological condition of the subject can be assessed based on a model of action by that subject. For example, an injury may affect the manner in which a subject walks. If the action of an injured subject is observed, labeled, and modeled, the model can be compared to models representing different types of injuries to determine the nature of the subject's injury. While the model of the subject's action can be compared against a plurality of models, alternatively the plurality of models can be indexed according to certain attributes. Similar attributes of the model of the subject's action can be determined and used to identify the most similar model from among the plurality of models without the need to perform an exhaustive comparison.

Furthermore, quality of movement of a subject can be assessed based on the model. For example, the movement of an athlete can compared against a model of instances of that athlete's best performance for a given action, against a model of a similar action performed by an exemplary athlete, such as a world record holder, or against a dynamic model optimized according to the physical constraints on the action. The quality of movement can be quantitatively expressed by determining a value that represents how close the model of the movement of the athlete is to the target model that the athlete seeks to emulate or to the optimized dynamic model.

Figure 11:
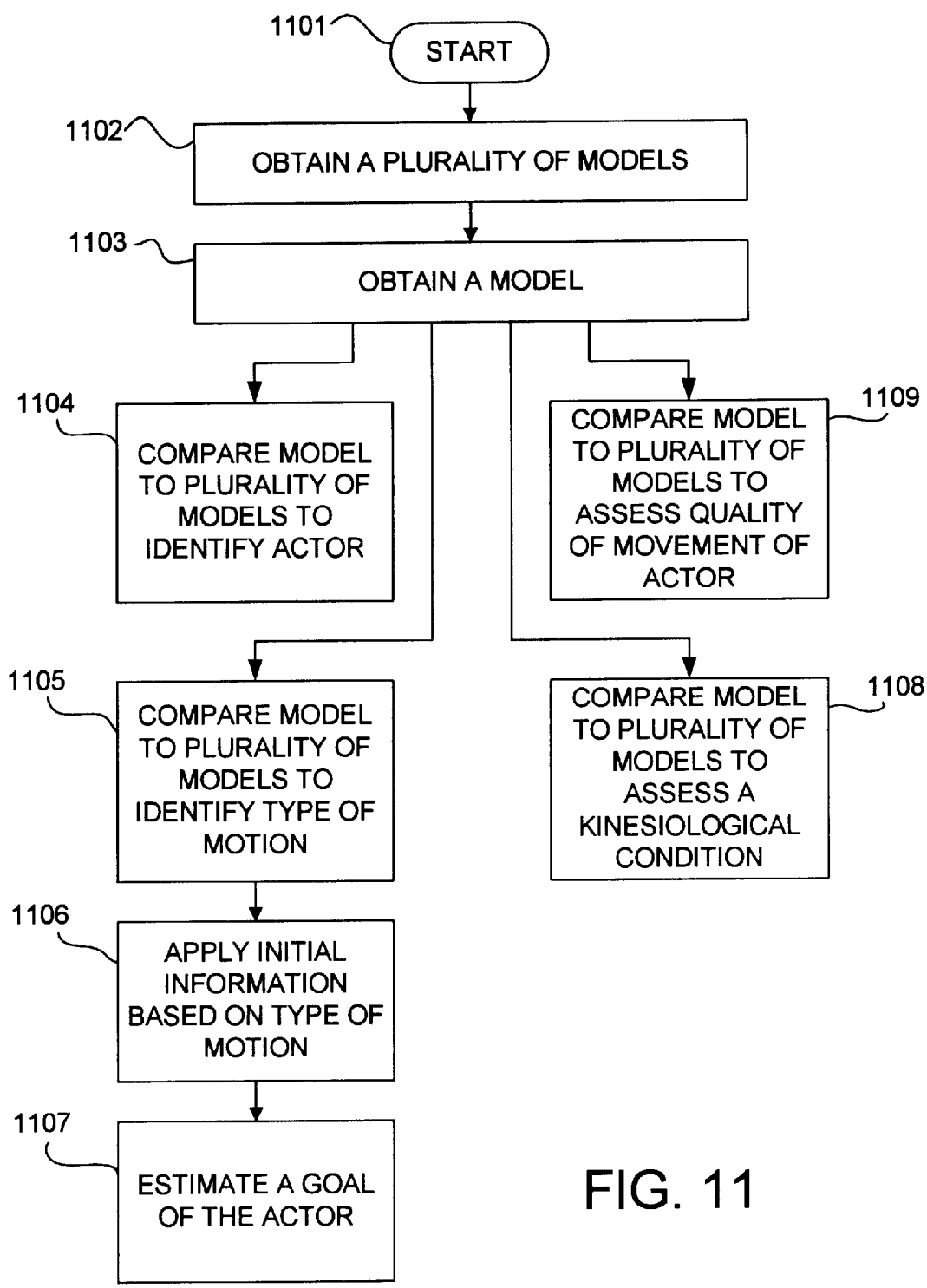
FIG. 11 is a flow diagram illustrating a plurality of embodiments of the invention.

FIG. 11 is a flow diagram illustrating a plurality of processes according to a plurality of embodiments of the invention. The process begins in step 1101. In step 1102, a plurality of models are obtained. This plurality of models may form a library of models and may include models of instances of motion performed by the same or different subjects. In step 1103, another model is obtained. In step 1104, which follows step 1103, the model obtained in step 1103 is compared to the plurality of models obtained in step 1102. In step 1105, which follows step 1103, the model obtained in step 1103 is compared to the plurality of models obtained in step 1102 to identify a type of motion. In step 1106, initial information is applied based on the type of motion determined in step 1105. The initial information may include information representing the position of a subject at the beginning of an action and information representing the sequence of changes of position as the action begins. In step 1107, a goal of the subject is estimated, for example by extrapolating the initial information based on the type of motion determined in step 1105.

In step 1108, which follows step 1103, the model is compared to the plurality of models to assess a physiological condition. In step 1109, which follows step 1103, the model is compared to the plurality of models or to a dynamic model based on physical constraints to assess a quality of movement of the subject.

The description that follows serves as an example of how the invention may be applied. The example relates to synthesis of reaching motions, such as the type of motion that a person might make with that person's hand to pick apples from a tree or to place letters from pigeonhole mailboxes.

To acquire motion samples adequate to describe a full range of reaching motions, motion samples of the subject reaching at different angles and over different distances can be acquired. For example, a subject who is standing, facing a single camera, may perform reaching motions with one hand to several positions (e.g., 15 positions) spread out at different angles (e.g., approximately "one hour" apart on an imaginary clock surrounding the subject vertically). The reaching motions may include some of a longer distance (e.g., reaching on a bigger clock with the arm fully extended) and some of a shorter distance (e.g., reaching on a smaller clock with the arm closer to the body).

Multiple samples may be acquired for each reaching motion to average out errors that may occur in particular attempts at a reaching motion. For example, if three samples of each "clock size" and reach location are obtained, the total number of samples obtained is equal to the number of samples times the number of reach positions times the number of "clock sizes" (e.g., 15 positions×2 clock sizes×3 samples=90 total samples).

The acquired samples are used to construct a matrix (e.g., a 28·120 by 90 matrix) The labels for the dataset are the (x,y) coordinates of the hand-tip for the reaching motions. After the learning step is complete and a function to map the labels to the motions has been identified, the accuracy of the function in reconstruction of the dataset can be analyzed. One mathematical approach to analyzing the accuracy of the function is to measure the percent root-mean-square (RMS) error on a frame-by-frame basis. This error is defined as $$E^{RMS} = \sqrt{\frac{\sum_i \|f^*(l^i) - m^i\|^2}{\sum_i \|m^i - \overline{m}\|^2}}$$

where $\overline{m}$ is the vector mean of all the motion samples. This error measurement has the property of being 0 if the approximating function is exact, and 1 if it is as inaccurate as the mean vector of all of the data, independent of the number of samples used.

Another approach to measuring the accuracy of the learned function is to perform a two-alternative forced-choice experiment with a number of observers. For each sampled motion, an observer is presented with a display of the motion based on the original dataset obtained from that original motion sample. The observer is also presented with a display of motion reconstructed according to the learned function (e.g. cubic interpolation). These displays of motion are presented in random order. The observer then attempts to identify which display of motion appeared more realistic. If the original and reconstructed motions were completely indistinguishable, observers should be performing the discrimination task at the chance level (50% correct responses). Experimental results show that embodiments of the invention are indeed capable of producing realistic animation.

Another example that illustrates how the invention may be applied involves synthesis of drawing motions. Such motions involve starting at a starting location, moving from the starting location to an ending location, and stopping at the ending location.

To acquire motion samples for drawing motions, a subject is positioned in view of a camera and performs drawing motions as if he were drawing on a blackboard. It is possible to simplify the learning task by requiring the subject to start at the same starting location for each drawing motion. This obviates the need to provide a label to designate the starting location. Alternatively, different starting locations may be used. The motion samples may be re-sampled to normalize their lengths.

Labels may be applied to the motion samples to designate the starting location, the ending location, and the shape of the stroke, among other parameters. In practice, to generate the motion corresponding to a stroke, a user can input the label by drawing it on the screen. However, for the purpose of learning the mapping function, an internal representation of the label may be used.

The trajectory of the stroke is represented as a cubic spline in the x and y coordinates as given by $$\begin{cases} x(t) = \sum_{i=0}^{3} a_i t^i \\ y(t) = \sum_{i=0}^{3} b_i t^i \end{cases}$$

where (x(0), y(0)) is the starting location and (x(1), y(1)) is the ending location. In its dataset, each motion sample has a sequence of many (e.g., 60) hand-tip coordinates through time. It is possible to use a least squares method to find the coefficients $\{a_i, b_i\}$ of the spline interpolation. However, such an interpolation is not guaranteed to pass exactly through the starting and ending locations, thereby diminishing the realism of the motion. In order to preserve this property, a constrained optimization routine may be used.

Experiments with labels of differing dimensions (e.g., 8 dimensions versus 2 dimensions) suggests various features that may be provided according to the invention. For example, as the number of dimensions increases, it is beneficial to increase the number of data samples to provide adequate examples within the motion space. Without increasing the amount of data, increased error may result.

Independent of the results of mathematical measurements of error, psychophysics experiments based on visual perception of human observers tend to confirm the realism of animation generated according to the invention. For example, where a linear polynomial model is used, experiments have shown that human observers performed at a chance level very consistently. Human perception of motion tends to differ from a frame-by-frame mathematical analysis of the same motion. Thus, differences may exist on a frame-by-frame basis or even with regard to the paths and progress of reconstructed or synthesized motions, yet the motions may still be perceived as realistic.

As another example of how the invention may be practiced, the aforementioned reaching and drawing motions may be merged to form a compound motion that involves reaching from a neutral pose to a starting location, drawing from the starting location to the ending location, and reaching back to the neutral pose. While combining the two learned motions in some cases may be achieved by matching the hand position from the end of one motion to the beginning of the next, other cases may require more attention to transition from one motion to the next. For example, since the hand position represents only one point of many points monitored in acquiring motion samples, other monitored points may be incongruent between the different motions. Such incongruence can lead to discontinuous jumps during the transition from one motion to the next.

One approach to solving this problem is to "smooth out" the pose discontinuity throughout the two motions. If $\delta$ represents the pose discontinuity between the end of the first motion m1 and the start of the second motion $m^2$, and if motion $m^1$ has $N_T$ frames, then the pose discontinuity can be spread out by adding the vector $i/2N_T\delta$ to the $i^{th}$ frame. In this way, by the time the $N_T^{th}$ frame is reached, the pose has been shifted to the mean of the two transition poses. A similar subtractive correction is applied to the second motion. In this way, smooth transitions may be achieved, and the two learned motion models can be combined to produce realistic sequences of movement. For the case of real-time motion generation, where the first motion has already been displayed and the second motion is being computed, the entire discontinuity can be blended forward in time.

What is claimed is:

1. A method for generating animation comprising the steps of:
    acquiring a data set of data samples representative of dynamic positional information regarding a plurality of points;
    labeling the data set based on a plurality of parameters;
    creating a mathematical model of a relation between the labels and the data set of data samples; and
    generating animation by applying the mathematical model to a motion plan.

2. The method of claim 1 wherein the step of labeling the data set based on a plurality of parameters further comprises the steps of:
    applying a goal label to the data set based on a goal parameter descriptive of a goal to which the data set is directed;
    applying a style label to the data set based on a style parameter descriptive of a style expressed in the data set; and
    applying a state label to a data sample to indicate a state of the dynamic positional information represented by the data sample.

3. The method of claim 1 wherein the step of creating a model based on the data set of data samples further comprises the steps of:
    generating local sub-models by mathematically analyzing the labeled data set; and
    combining the local sub-models to yield the model.

4. The method of claim 3 wherein the step of creating a model based on the data set of data samples further comprises the step of:
    characterizing variations in dynamic position information according to a probabilistic sub-model;
    incorporating the probabilistic sub-model into the model.

5. The method of claim 1 wherein the step of generating animation by applying the model to a motion plan further comprises the steps of:
    designating joint coordinates using learned functions; and
    using the joint coordinates to render a synthetic character.

6. The method of claim 5 further comprising the step of:
    combining joint coordinates of different desired motions.

7. The method of claim 1 wherein the step of generating animation by applying the model to a motion plan further comprises the steps of:
    defining virtual markers correlated to the plurality of points;
    designating a desired motion of the virtual markers;
    calculating joint coordinates based on the desired motion of the virtual markers; and
    using the joint coordinates to render a synthetic character.

8. The method claim 7 further comprising the step of:
    combining joint coordinates of different desired motions.

9. The method of claim 1 further comprising the steps of:
    acquiring a second data set of second data samples representative of second dynamic positional information regarding the plurality of points;
    labeling the second data set based on the plurality of parameters;
    creating a second model based on the second data set of second data samples;
    wherein the step of generating animation by applying the model to the motion plan also applies the second model to the motion plan.

10. The method of claim 1 wherein the step of generating animation by applying the model to the motion plan is performed according to a script.

11. The method of claim 1 wherein the step of generating animation by applying the model to the motion plan is performed according to a random process.

12. The method of claim 1 wherein the step of generating animation by applying the model to the motion plan is performed according to a behavioral model.

13. The method of claim 12 wherein the step of generating animation by applying the model to the motion plan further comprises the step of:
    animating agents for interacting with users over a network.

14. The method of claim 12 wherein the step of generating animation by applying the model to the motion plan further comprises the step of:
    animating agents in computer games for interacting with users.

15. The method of claim 1 wherein the step of generating animation by applying the model to the motion plan is performed in response to an input received from a user input device.

16. The method of claim 15 wherein the step of generating animation by applying the model to the motion plan further comprises the step of:

animating a user's character in an interactive computer game in response to an input received from a user input device.

17. The method of claim 15 wherein the step of generating animation by applying the model to the motion plan further comprises the step of:

generating animation of a synthetic character awakened in response to the input received from the user input device.

18. The method of claim 15 wherein the step of generating animation by applying the model to the motion plan further comprises the step of:

adapting the motion plan based on historical user interaction.

19. The method claim 18 wherein the step of adapting the motion plan based on historical user interaction further comprises the step of:

incorporating a random variation component into the motion plan.

20. The method of claim 1 wherein the step of creating a model based on the data set of data samples further comprises the step of:

creating the model based on the plurality of parameters.

21. The method of claim 1 wherein the step of generating animation by applying the model to the motion plan further comprises the steps of:

dividing a complex motion plan into a plurality of basic motion plans;

applying a corresponding model to each of the basic motion plans to generate a plurality of animation components; and combining the animation components to yield animation according to the complex motion plan.

22. The method of claim 1 wherein the step of generating animation by applying the model to the motion plan further comprises the step of:

generating animation based on an input received from a sensor.

23. The method of claim 22 wherein the step of generating animation based on the input received from the sensor further comprises the step of:

animating a character to imitate the motion of a user observed using the sensor.

24. The method of claim 22 wherein the step of generating animation based on an input received from a sensor comprises the steps of:

receiving the input from the sensor;

determining an activity of a subject based on the input from the sensor; and generating animation based on the activity.

25. The method of claim 24 wherein the step of generating animation based on the activity occurs when a computer coupled to the sensor is in a quiescent mode.

26. The method of claim 24 wherein the step of generating animation based on the activity occurs when a computer coupled to the sensor is in an active mode.

27. The method of claim 1 wherein the step of generating animation by applying the model to a motion plan comprises the step of:

extracting animation information from audio information.

28. The method of claim 27 wherein the step of extracting animation information from audio information comprises the step of:

obtaining audio information from a microphone.

29. The method of claim 27 wherein the step of extracting animation information from audio information comprises the step of:

obtaining audio information from a communication circuit.

30. The method of claim 27 wherein the step of extracting animation information from audio information comprises the step of:

obtaining audio information from an audio recording.

31. The method of claim 27 wherein the step of extracting animation information from audio information comprises the step of:

analyzing music to obtain animation information.

32. The method of claim 31 wherein the step of analyzing music to obtain animation information comprises the step of:

extracting rhythm information from the music.

33. The method of claim 27 wherein the step of generating animation by applying the model to a motion plan further comprises the step of:

applying a specified command according to the animation information.

34. The method of claim 27 wherein the step of extracting animation information from audio information comprises the step of:

analyzing speech to obtain animation information.

35. The method of claim 1 wherein the step of generating animation by applying the model to a motion plan comprises the step of:

extracting animation information from motion information.

36. The method of claim 1 wherein the step of extracting animation information from motion information comprises the step of:

extracting animation information from an example of human motion.

37. The method of claim 36 wherein the step of extracting animation information from the example of human motion is dependent on a velocity of the example of human motion.

38. The method of claim 1 wherein the step of extracting animation information from motion information comprises the step of:

extracting animation information from an example of non-human motion.

39. The method of claim 38 wherein the step of extracting animation information from the example of non-human motion is dependent on a velocity of the example of non-human motion.

40. The method of claim 1 wherein the step of creating a model based on the data set of data samples further comprises the step of:

learning a style based on a residual motion component with respect to a baseline motion component.

41. The method of claim 1 wherein the step of generating animation by applying the model to a motion plan further comprises the step of:

combining a residual motion animation component to a baseline motion animation component.

42. A method for generating animation of a synthetic character comprising the steps of:

acquiring a data set of data samples representative of dynamic positional information regarding a plurality of points, the plurality of points denoting a structural relationship of a subject;

labeling the data set based on a plurality of parameters;

creating a model based on the data set of data samples; and applying the model to generate animation of a synthetic character, the synthetic character having reference points corresponding a second structural relationship of the synthetic character, the reference points differing in configuration from the plurality of points.

43. The method of claim 42 wherein the step of applying the model to generate animation of a synthetic character further comprises the step of:

determining the reference points by adjusting a scale of the plurality of points.

44. The method of claim 42 wherein the step of applying the model to generate animation of a synthetic character further comprises the step of:

determining the reference points by adjusting an angular relationship of the plurality of points.

45. A method for controlling motion of apparatus comprising the steps of:

acquiring a data set of data samples representative of dynamic positional information regarding a plurality of points;

labeling the data set based on a plurality of parameters;

creating a mathematical model of a relation between the labels and the data set of data samples; and controlling the motion of the apparatus by applying the mathematical model to a motion plan.

46. The method of claim 45 wherein the step of labeling the data set based on a plurality of parameters further comprises the steps of:

applying a goal label to the data set based on a goal parameter descriptive of a goal to which the data set is directed;

applying a style label to the data set based on a style parameter descriptive of a style expressed in the data set; and applying a state label to a data sample to indicate a state of the dynamic positional information represented by the data sample.

47. The method of claim 45 wherein the step of creating a model based on the data set of data samples further comprises the steps of:

generating local sub-models by mathematically analyzing the labeled data set; and combining the local sub-models to yield the model.

48. The method of claim 47 wherein the step of creating a model based on the data set of data samples further comprises the step of:

characterizing variations in dynamic position information according to a probabilistic sub-model;

incorporating the probabilistic sub-model into the model.

49. The method of claim 45 wherein the step of controlling the motion of the apparatus by applying the model to a motion plan further comprises the steps of:

defining virtual markers correlated to the plurality of points;

designating a desired motion of the virtual markers;

calculating joint coordinates based on the desired motion of the virtual markers; and using the joint coordinates to control the motion of the apparatus.

50. The method of claim 45 further comprising the steps of:

acquiring a second data set of second data samples representative of second dynamic positional information regarding the plurality of points;

labeling the second data set based on the plurality of parameters;

creating a second model based on the second data set of second data samples;

wherein the step of controlling the motion of the apparatus by applying the model to a motion plan also applies the second model to the motion plan.

51. The method of claim 45 wherein the step of controlling the motion of the apparatus by applying the model to a motion plan is performed according to a script.

52. The method of claim 45 wherein the step of controlling the motion of the apparatus by applying the model to a motion plan is performed according to a random process.

53. The method of claim 45 wherein the step of controlling the motion of the apparatus by applying the model to a motion plan is performed according to a behavioral model.

54. The method of claim 45 wherein the step of controlling the motion of the apparatus by applying the model to a motion plan is performed in response to an input received from a user input device.

55. The method of claim 54 wherein the step of controlling the motion of the apparatus by applying the model to a motion plan further comprises the step of:

adapting the motion plan based on historical user interaction.

56. The method claim 55 wherein the step of adapting the motion plan based on historical user interaction further comprises the step of:

incorporating a random variation component into the motion plan.

57. The method of claim 45 wherein the step of creating a model based on the data set of data samples further comprises the step of:

creating the model based on the plurality of parameters.

58. The method of claim 45 wherein the step of controlling the motion of the apparatus by applying the model to a motion plan further comprises the steps of:

dividing a complex motion plan into a plurality of basic motion plans;

applying a corresponding model to each of the basic motion plans to generate a plurality of animation components; and combining the animation components to yield control of the motion according to the complex motion plan.

59. The method of claim 45 wherein the step of controlling the motion of the apparatus by applying the model to a motion plan further comprises the step of:

controlling the motion of the apparatus based on an input received from a sensor.

60. The method of claim 59 wherein the step of controlling the motion of the apparatus based on an input received from a sensor comprises the steps of:

receiving the input from the sensor;

determining an activity of a subject based on the input from the sensor; and controlling the motion of the apparatus based on the activity.

61. The method of claim 45 wherein the step of controlling the motion of the apparatus by applying the model to a motion plan comprises the step of:

extracting motion control information from audio information.

62. The method of claim 61 wherein the step of extracting motion control information from audio information comprises the step of:

obtaining audio information from a microphone.

63. The method of claim 61 wherein the step of extracting motion control information from audio information comprises the step of:

obtaining audio information from a communication circuit.

64. The method of claim 61 wherein the step of extracting motion control information from audio information comprises the step of:

obtaining audio information from an audio recording.

65. The method of claim 61 wherein the step of extracting motion control information from audio information comprises the step of:

analyzing music to obtain motion control information.

66. The method of claim 65 wherein the step of analyzing music to obtain motion control information comprises the step of:

extracting rhythm information from the music.

67. The method of claim 61 wherein the step of controlling the motion of the apparatus by applying the model to a motion plan further comprises the step of:

applying a specified command according to the motion control information.

68. The method of claim 61 wherein the step of extracting the motion control information from audio information comprises the step of:

analyzing speech to obtain motion control information.

69. The method of claim 45 wherein the step of controlling the motion of the apparatus by applying the model to a motion plan comprises the step of:

extracting motion control information from motion information.

70. The method of claim 45 wherein the step of extracting motion control information from motion information comprises the step of:

extracting motion control information from an example of human motion.

71. The method of claim 70 wherein the step of extracting motion control information from the example of human motion is dependent on a velocity of the example of human motion.

72. The method of claim 45 wherein the step of extracting motion control information from motion information comprises the step of:

extracting motion control information from an example of non-human motion.

73. The method of claim 72 wherein the step of extracting motion control information from the example of non-human motion is dependent on a velocity of the example of non-human motion.

74. The method of claim 45 wherein the step of creating a model based on the data set of data samples further comprises the step of:

learning a style based on a residual motion component with respect to a baseline motion component.

75. The method of claim 45 wherein the step of controlling the motion of the apparatus by applying the model to a motion plan further comprises the step of:

combining a residual motion control component to a baseline motion control component.

76. A method for providing computer vision comprising the steps of:

acquiring a data set of data samples representative of dynamic positional information regarding a plurality of points of a subject;

labeling the data set based on a plurality of parameters;

creating a mathematical model of a relation between the labels and the data set of data samples.

77. The method of claim 76 further comprising the step of:

comparing the model to a plurality of previously obtained models for recognizing a particular action.

78. The method of claim 76 further comprising the step of:

identifying a previously obtained model similar to the model for identifying the subject.

79. The method of claim 76 further comprising the step of:

estimating a goal of the subject based on the data set and the model.

80. The method of claim 76 further comprising the step of:

assessing a kinesiological condition based on the model.

81. The method of claim 76 further comprising the step of:

assessing a quality of movement of the subject based on the model.

82. A method for generating animation comprising:

acquiring a plurality of motion samples;

assigning a label to each acquired motion sample;

generating a mathematical function mapping the labels to the acquired motion samples; and generating a desired motion based on the learned function.

83. The method of claim 82, wherein the generating of the desired motion comprises:

assigning to the label a value representing the desired motion; and computing the desired motion using the label as input to the learned function.

* * * * *

UNITED STATES PATENT AND TRADEMARK OFFICE
CERTIFICATE OF CORRECTION

| | | |
|---|---|---|
| PATENT NO. | : 6,552,729 B1 | Page 1 of 2 |
| APPLICATION NO. | : 09/434210 | |
| DATED | : April 22, 2003 | |
| INVENTOR(S) | : Enrico Di Bernardo et al. | |

It is certified that error appears in the above-identified patent and that said Letters Patent is hereby corrected as shown below:

In Column 15 line 51, please delete "of data samples," and insert therefore -- including a plurality of motion samples, each motion sample --.
In Column 15 line 54, please insert -- motion samples of the -- after "labeling the".
In Column 15 line 56, please delete "data set of data samples" and insert therefore -- motion samples of the --.
In Column 15 line 59, please insert -- motion samples of the -- after "the step of labeling the".
In Column 15 line 62, please insert -- motion samples of the -- after "applying a goal label to the".
In Column 15 line 65, please insert -- motion samples of the -- after "applying a style label to the".
In Column 16 line 1, please delete "a data sample," and insert therefore -- the motion samples of the data set --.
In Column 16 line 3, please delete "data sample," and insert therefore -- motion samples --.
In Column 16 line 4-5, please delete "a model based on the data set of data samples," and insert therefore -- the mathematical model --.
In Column 16 line 10-11, please delete "a model based on the data set of data samples," and insert therefore -- the mathematical model --.
In Column 17 line 23-24, please delete "a model based on the data set of data samples," and insert therefore -- the mathematical model --.
In Column 18 line 50-51, please delete "a model based on the data set of data samples," and insert therefore -- the mathematical model --.
In Column 18 line 63, please delete "of data samples," and insert therefore -- including a plurality of motion samples, each motion sample --.
In Column 18 line 67, please insert -- motion samples of the -- after "labeling the".
In Column 19 line 1, please delete "model based on the data set of data samples," and insert therefore -- mathematical model of a relation between the labels and the motion samples of the data set --.
In Column 19 line 20, please delete "set of data samples," and insert therefore -- set including a plurality of motion samples, each motion sample --.
In Column 19 line 23, please insert -- motion samples of the -- after "labeling the".
In Column 19 line 25, please delete "data set of data samples," and insert therefore -- motion samples of the data set --.

Signed and Sealed this
Fifth Day of April, 2011

David J. Kappos
*Director of the United States Patent and Trademark Office*

CERTIFICATE OF CORRECTION (continued)
U.S. Pat. No. 6,552,729 B1

In Column 19 line 29, please insert -- motion samples of the -- after "labeling the".
In Column 19 line 31, please insert -- motion samples of the -- after "applying a goal label to the".
In Column 19 line 34, please insert -- motion samples of the -- after "applying a style label to the".
In Column 19 line 37, please delete "a data sample," and insert therefore -- motion samples of the data set --.
In Column 19 line 47, please delete "a model based on the data set of data samples," and insert therefore -- the mathematical model --.
In Column 20 line 32, please delete "a model based on the data set of data samples," and insert therefore -- the mathematical model --.
In Column 22 line 2, please delete "a model based on the data set of data samples," and insert therefore -- the mathematical model --.
In Column 22 line 14, please delete "of data samples"," and insert therefore -- including a plurality of motion samples, each motion sample --.
In Column 22 line 17, please insert -- motion samples of the -- after "labeling the".
In Column 22 line 19, please delete "data set of data samples" and insert therefore -- motion samples of the data set --.